US006418638B1

(12) United States Patent
Forster et al.

(10) Patent No.: US 6,418,638 B1
(45) Date of Patent: Jul. 16, 2002

(54) DRYER CONTROL SYSTEM

(75) Inventors: John Forster, Holland Landing; Stephen Dennis, Fredericton, both of (CA); Jean-Louis Mongrolle, Chambery (FR)

(73) Assignee: Westroc, Inc.

( * ) Notice: Subject to any disclaimer, the term of this patent is extended or adjusted under 35 U.S.C. 154(b) by 0 days.

(21) Appl. No.: 09/483,789

(22) Filed: Jan. 14, 2000

(30) Foreign Application Priority Data

Jan. 18, 1999 (CA) ............................................ 2259743

(51) Int. Cl.[7] ............................ F26B 3/00; B32B 13/00

(52) U.S. Cl. ............................ 34/444; 34/446; 34/526; 34/527; 34/543; 34/624; 156/39

(58) Field of Search .......................... 34/524, 526, 527, 34/539, 543, 551, 624, 417, 418, 419, 422, 446, 444; 156/39

(56) References Cited

U.S. PATENT DOCUMENTS

| | | | | | |
|---|---|---|---|---|---|
| 4,113,554 | A | * | 9/1978 | McGarry et al. | 162/123 |
| 4,204,337 | A | * | 5/1980 | Roos et al. | 34/31 |
| 4,383,960 | A | * | 5/1983 | Delcoigne et al. | 264/87 |
| 4,498,864 | A | * | 2/1985 | Roth et al. | 432/8 |
| 5,010,659 | A | * | 4/1991 | Treleven | 34/41 |
| 5,323,546 | A | * | 6/1994 | Glover et al. | 34/267 |
| 5,377,428 | A | * | 1/1995 | Clark | 34/446 |
| 5,465,504 | A | * | 11/1995 | Joiner | 34/446 |
| 5,603,168 | A | | 2/1997 | McMahon, Jr. | |
| 5,632,848 | A | * | 5/1997 | Richards et al. | 156/346 |
| 5,659,972 | A | * | 8/1997 | Min et al. | 34/225 |
| 5,682,684 | A | * | 11/1997 | Wentzlaff et al. | 34/495 |
| 5,714,001 | A | * | 2/1998 | Savoly et al. | 106/678 |
| 5,997,779 | A | * | 12/1999 | Potter | 264/40.1 |
| 6,045,730 | A | * | 4/2000 | Potter | 264/40.1 |
| 6,169,848 | B1 | * | 1/2001 | Henry | 392/307 |

FOREIGN PATENT DOCUMENTS

DE 3741128 A1 6/1988

OTHER PUBLICATIONS

Näsman et al, ZKG International 46 (1993) Juni, No. 6, Wiesbaden, DE "Drying of Plasterboard".

* cited by examiner

*Primary Examiner*—Ira S. Lazarus
*Assistant Examiner*—K. B. Rinehart
(74) *Attorney, Agent, or Firm*—Young & Basile

(57) ABSTRACT

A control system and method for a dryer used to dry a line of gypsum boards. The control system automates control of the dryer by measuring the amount of water used at the mixer to produce board segments and determining a desired amount of water to be evaporated for each board segment based on the measured value. The desired amount of water to be evaporated for each board segment is tracked through the production line and the total evaporation load of each dryer zone is continuously calculated based on the board segments located in the dryer zone at a given time. The dryer zone differential temperature is adjusted according to the calculated evaporation load. When a board is rejected from the board line, the desired amounts of water to be evaporated of its corresponding board segments are set to zero, thus signifying a gap. The control system can be implemented using a distributed control concept, with PLC's controlling major process areas, and networked PC based supervisory operator interfaces located at key locations throughout the production line.

19 Claims, 4 Drawing Sheets

DRYER CONTROL SYSTEM

BACKGROUND OF INVENTION

The present invention relates to a dryer control system for use in manufacturing gypsum board.

Gypsum board is produced by extruding a gypsum, water and foam slurry between two continuous paper sheets, cutting the resulting ribbon into boards, and passing the boards through a board dryer. In recent years, there has been a move to automate the gypsum board manufacturing process. However, attempts to integrate automatic control of both the mixer and the dryer have been limited or have experienced shortcomings. In the past, dryer control has been done by measuring moisture content of the gypsum boards as they exit the dryer and manually adjusting the dryer temperature accordingly. However, such a procedure relies on trial and error and operator skill and attentiveness, especially when changes in board formulation occur. Additionally, in currently known systems, operators have to adjust the dryer temperature manually to compensate for gaps that occur in the line of boards introduced to the dryer. Such gaps are typically caused by boards being rejected after the cutting process, and by spaces in the board line created at the start and end of a production run. Failure to adjust the dryer temperature to compensate for changes in the dryer evaporative load that result from changes in board formulations or gaps in the board line can result in over dried boards.

It is therefore desirable to provide an automated dryer control system and method in which the temperature of the board dryer is automatically adjusted to account for different board formulations, lengths and also gaps of varying sizes which occur in the line of boards provided to the dryer.

SUMMARY OF INVENTION

The present invention provides a dryer control system and method wherein the load of boards to be provided to the dryer is divided up into successive segments. A desired amount of water to be evaporated from each segment is determined based on the amount of water used to produce each segment. The desired amount of water to be evaporated from each segment is used as a basis for continuously calculating the evaporation load for the dryer and controlling the amount of energy provided to the dryer accordingly.

According to one aspect of the present invention, there is provided a method for controlling temperature of a dryer in a gypsum board production line in which a load that includes a line of boards is provided to the dryer, comprising the steps of dividing the load to be provided to the dryer into segments along a length of the load, determining a desired amount of water to be evaporated from each of the load segments, determining the amount of energy required to evaporate the desired amounts of water from the load segments located in the dryer at a particular time, and adjusting the heat energy provided to the dryer according to the determined amount of energy.

According to another aspect of the invention, there is provided a gypsum board drying device for a gypsum board production line, comprising a dryer having a heat energy source for providing heat energy to the dryer, a transfer system for transferring a load comprising a line of gypsum boards to and through the dryer, and a control system for the dryer. The control system for the dryer includes determining means for dividing the load to be transferred to the dryer into segments along its length and determining a desired amount of water to be evaporated from each of the load segments, calculation means responsive to the determining means for determining the amount of energy required to evaporate the desired amounts of water from all of the load segments located in the dryer during a particular time period, and adjustment means responsive to the calculation means and operatively connected to the heat energy source for adjusting the heat energy provided to the dryer according to the determined amount of energy.

According to a further aspect of the invention, there is provided a dryer control system for controlling the operation of a dryer in a gypsum board production line in which a load that includes a line of gypsum boards is provided to the dryer, the system comprising determining means for measuring the amount of water provided to a mixer station of the production line, dividing the load into a series of consecutive load segments of uniform length, and determining and storing a desired amount of water to be evaporated from each of the consecutive load segments based on the measured amount of water, calculating means responsive to the determining means for determining an evaporation load of the dryer based on the desired amounts of water to be evaporated from all of the load segments located in the dryer at a particular time, and adjustment means responsive to the calculating means for controlling a heating element of the dryer to adjust heat energy provided to the dryer according to the determined evaporation load.

DESCRIPTION OF THE PREFERRED EMBODIMENT

Figure 1:
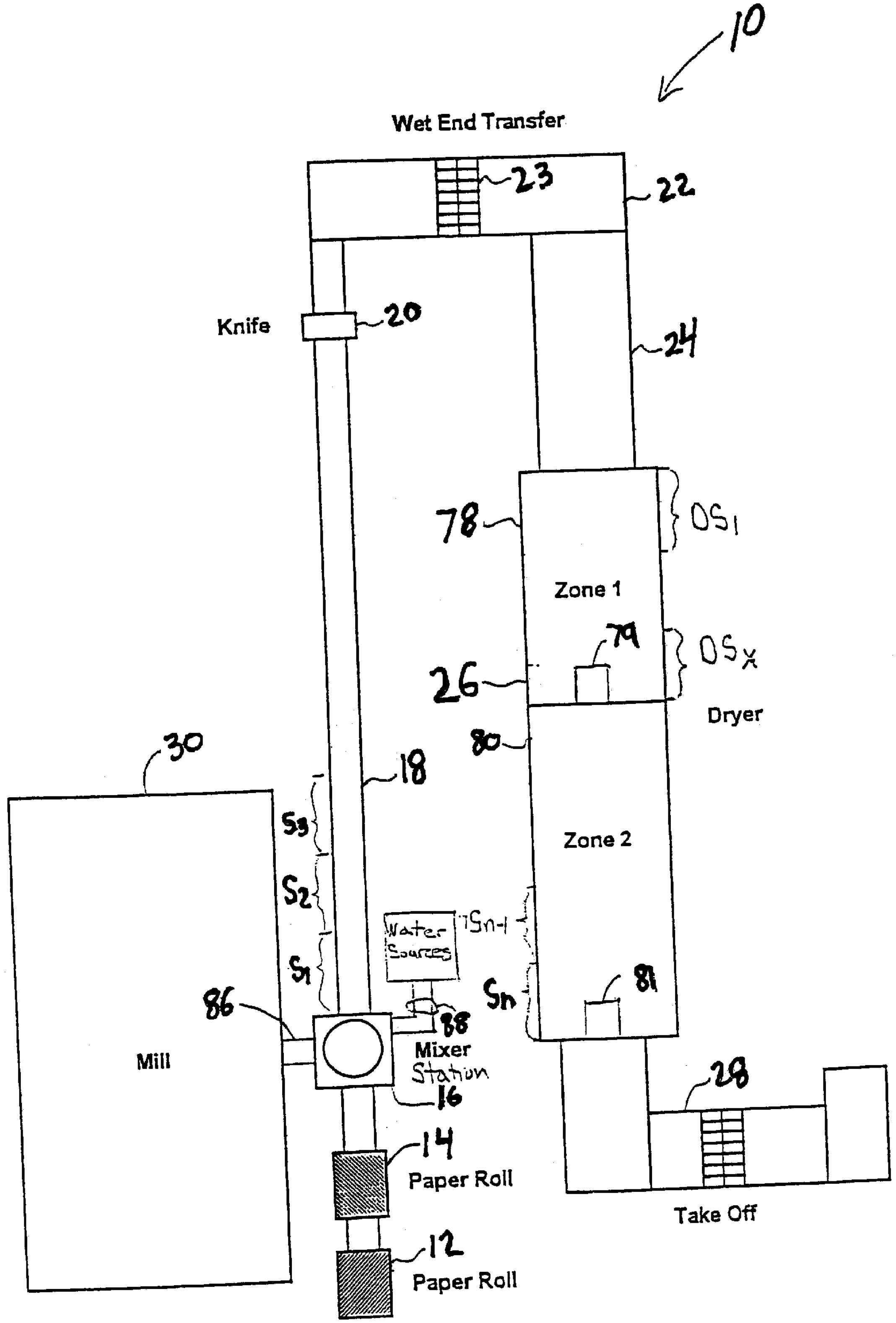
FIG. 1 is a schematic overview of a production line used to produce gypsum board.

The present invention will now be explained with reference to the figures. FIG. 1 shows a simplified schematic view of a gypsum board production line, illustrated generally by reference numeral 10. The basic components of the production line 10 shown in FIG. 1 are well known and include upper and lower paper rolls 12 and 14, mixer station 16, forming belt 18, knife 20 and dryer 26. During operation, a mill 30 supplies calcined gypsum to the mixer station 16. Water and other additives are added to the calcined gypsum at the mixer station 16, which includes a mixer and an extruder (not shown). The mixer mixes the calcined gypsum and water (and other additives) to produce a stucco mixture that is transferred to the extruder and extruded between upper and lower paper sheets which are provided by the paper rolls 12 and 14 to form a continuous strip of gypsum board. The gypsum board is transferred along the forming belt 18 until it reaches the knife 20 at which point the continuous sheet is cut into predetermined board lengths. The cut boards are then provided to a wet end transfer station 22 where rejected boards can be removed from the production line by a reject gate 23. From the wet end transfer station 22 the boards that are not rejected are transferred by a dryer transfer system 24 to and through the dryer 26. The dryer 26 functions to evaporate the free moisture contained in the boards, after which the boards are removed from the production line at a take-off station 28. The dryer 26 includes two separately controlled dryer zones 78 and 80, each of which has its own heat energy source (such as a burner) 79 and 81, respectively.

Figure 2:
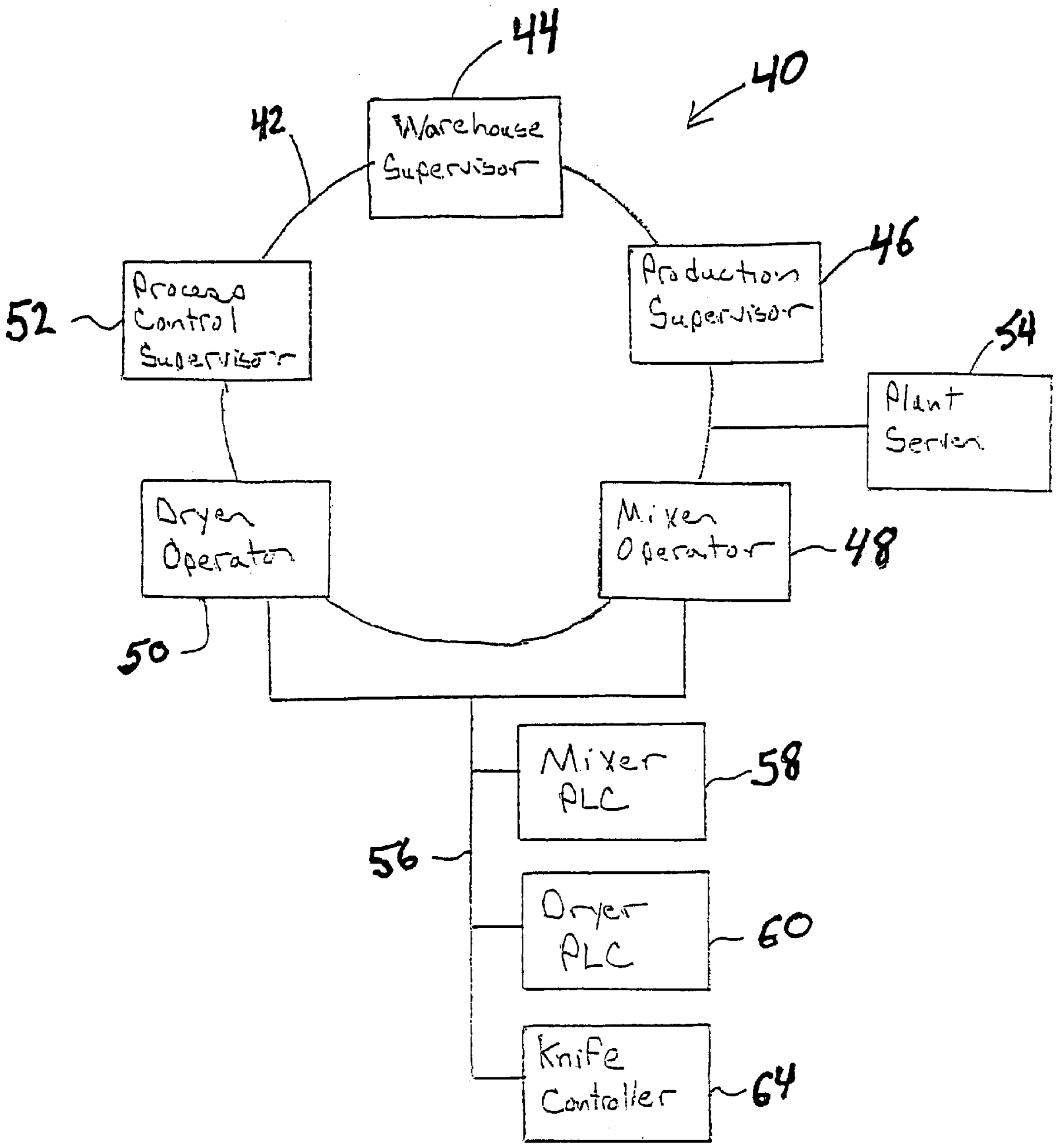
FIG. 2 is a block diagram of a preferred embodiment of a control system for the gypsum board manufacturing process in accordance with the present invention.

The present invention is based on automated control of the dryer 26 by using feed data from the mixer station 16 to calculate the evaporation load for the dryer in successive time periods and control the dryer accordingly. In order to integrate control of the mixer and dryer, the present invention comprises a control system, indicated generally by 40, shown in FIG. 2. The control system 40 makes use of a PLC based distributed control concept, with PLCs controlling major process areas, and PC based supervisory operator interfaces located at key locations in the board manufacturing process.

The control system 40 includes a supervisory system 42 which includes a network of PC based operator interfaces, namely a warehouse supervisor interface 44, a production supervisor interface 46, a mixer operator interface 48, a dryer operator interface 50 and a process control supervisor interface 52. Preferably each of the operator interfaces is an industrial work station consisting of an industrial quality PC and monitor. In one preferred embodiment, the operator interfaces of the supervisory system 42 use a WINDOWS NT (Trade-mark) operating system, and are networked by means of a Novell Netware (Trade-mark) token ring local area network. One software system which can be used as the supervisory system 42 is the Intellution Fix Supervisory System (Trade-mark).

The supervisory system 42 is connected to a plant server 54 which, among other things, contains the master recipes for producing different production runs of gypsum board. The supervisory system 42 is also connected, via a link 56, to a plurality of PLC systems which are used to control the operation of the various process components of the plant 10. In particular, the control system 40 includes a PLC system 58 for controlling the operation of the mixer 16, a PLC system 60 for controlling the operation of the dryer unit 26 and for tracking and logging the progress of boards through the production line 10, and a knife controller 64 for controlling the operation of knife 20.

The operator interfaces of the supervisory system 42 are each preferably configured to perform a specific operation. The warehouse supervisor interface 44 allows an operator to select production runs and add them to the production queue. The production supervisor interface 46 allows a supervisor to review the production queue, product recipes, and monitor the operation of production line 10. The mixer operator interface 48 provides mixer monitoring and control, and allows new production runs to be initiated. The dryer operator interface 50 allows the operation of dryer 26 to be monitored and controlled. The process control supervisor interface 52 is provided for maintenance and modification of recipes, as well as for viewing a representation of the overall process.

In one preferred embodiment, the PLC systems 58 and 60 are Allen Bradley PLC 5 Series (Trade-mark) PLC systems, and the link 56 is provided by using Allen Bradley Data Highway Plus (Trade-mark). Programming of the PLCs is effected through Allan Bradley (Trade-Mark) PLC Programming Software.

Figure 4:
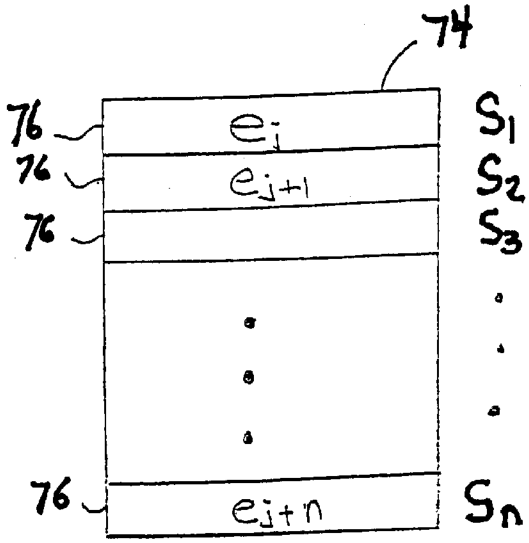
FIG. 4 is a block diagram of a shift register of the control system used to store and track free water values for boards.

The operation of the control system 40 will now be discussed. The dryer PLC 60 includes a shift register 74, as represented in FIG. 4, having n register blocks 76, for tracking the location of a particular load segment and a desired amount of water to be evaporated from the load segment as it progresses along the production line 10. In this regard, the entire production line 10 from the output of the extruder of the mixer station 16 to the end of the dryer 26 is divided into a number of theoretical segments by the control system 40, illustrated by $S_1, S_2, S_3 \ldots S_n$ in FIG. 1, of equal length. The length of each segment Si (where $1 \leqq i \leqq n$) is a pre-set value that is determined by the length of the production line and the number of shift register blocks 76. Each of the blocks 76 of the shift register 74 is associated with one of the segments $S_i$ of the production line 10, as illustrated in FIG. 4.

Figure 5:
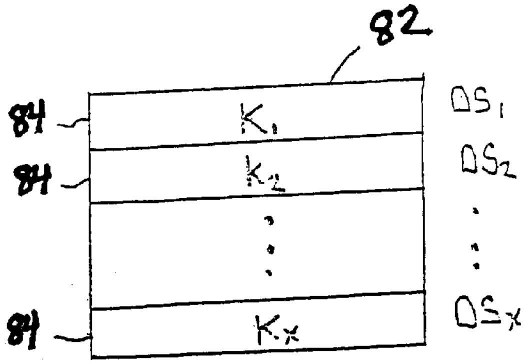
FIG. 5 is a block diagram of a register of the control system used to store coefficients of evaporation for segments of the dryer.

Each of the dryer zones 78 and 80 of the dryer 26 are also further divided into a number of segments of equal length corresponding to the length of the production line segments $S_i$. The segments for the first dryer zone 78 are illustrated on FIG. 1 as $DS_1 \ldots DS_x$, where x is the total number of segments for the first dryer zone 78. The dryer segments $DS_1 \ldots DS_x$ of the first dryer zone 78 and the dryer segments of the second dryer zone 80 line up with corresponding production line segments Si that are located along the length of the dryer zones 78 and 80. The dryer PLC 60 is configured to provide a further register for each of the dryer zones 78 and 80, each register having a number of register blocks equal to the number of segments that the dryer zone has been divided into. By way of example, the register 82 for the first dryer zone 78, with reference to FIG. 5, has x blocks 84, each of which is associated with one of the dryer segments $DS_1$ to $DS_x$. The register for the second dryer zone 80 is similarly configured.

A value representing the coefficient of evaporation $k_m$(where $1 \leqq m \leqq x$) for each dryer segment $DS_1 \ldots DS_x$ is stored in the register block 84 that is associated with a corresponding dryer segment. These coefficients, when combined together, make up the evaporation curves for the dryer. The coefficients for each segment of the dryer zones 78 and 80 are fixed values that have been calculated based on the theoretical design of the dryer 26 and corrected by experience.

Figure 3:
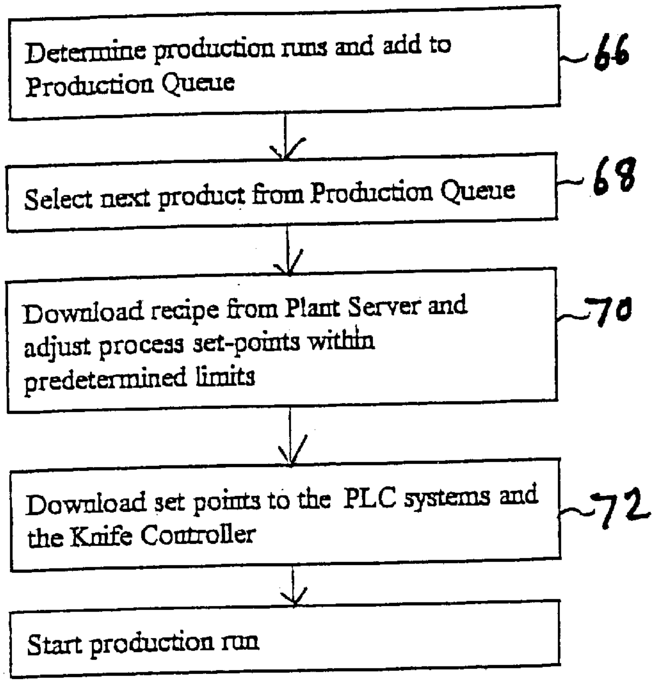
FIG. 3 is a flow diagram of pre-production steps performed by the control system of the present invention.

FIG. 3 shows a flow chart of the pre-production steps taken by the control system 40. In particular, as indicated by block 66, the first pre-production step involves the determination of what production runs are required, which are typically entered at the warehouse supervisor interface 44. A list of required production runs is then provided to the production supervisor interface 46 and the mixer operator interface 48 where they are added to a production queue list which contains a list of production runs required, the one currently active, and those production runs that are partially or fully completed. As indicated by block 68, while a current product is being run, or before start-up of the process, an operator can use the mixer operator interface to select the next product to be made from the production queue. As indicated by block 70, once a particular product is selected, the supervisory system 42 will download a set of product and process specifications for that particular product which are maintained in a secure database located on the plant server 54. These product and process specifications constitute the basis of a "recipe", which consists of formulations, process control set points, and instructions for producing that particular product (including board length). The recipes maintained on the plant server 54 are known as "master recipes", and once the recipes are downloaded to the supervisory system 42 they are known as "control recipes".

Once a product has been selected from the production queue and the recipe for that product downloaded, the mixer operator interface 48 will display the recipe for that product and allow the operator to adjust certain set points within pre-set limits, if desired (see block 70). As indicated by block 72, during the start-up of a production run for a particular product, the mixer operator interface 48 is used to configure the various PLC systems of the production line 10 and the knife controller. To do this, the mixer operator interface 48 downloads various set points to each of the PLC systems and the knife controller 64 that are based on the specific product to be produced.

Figure 6:
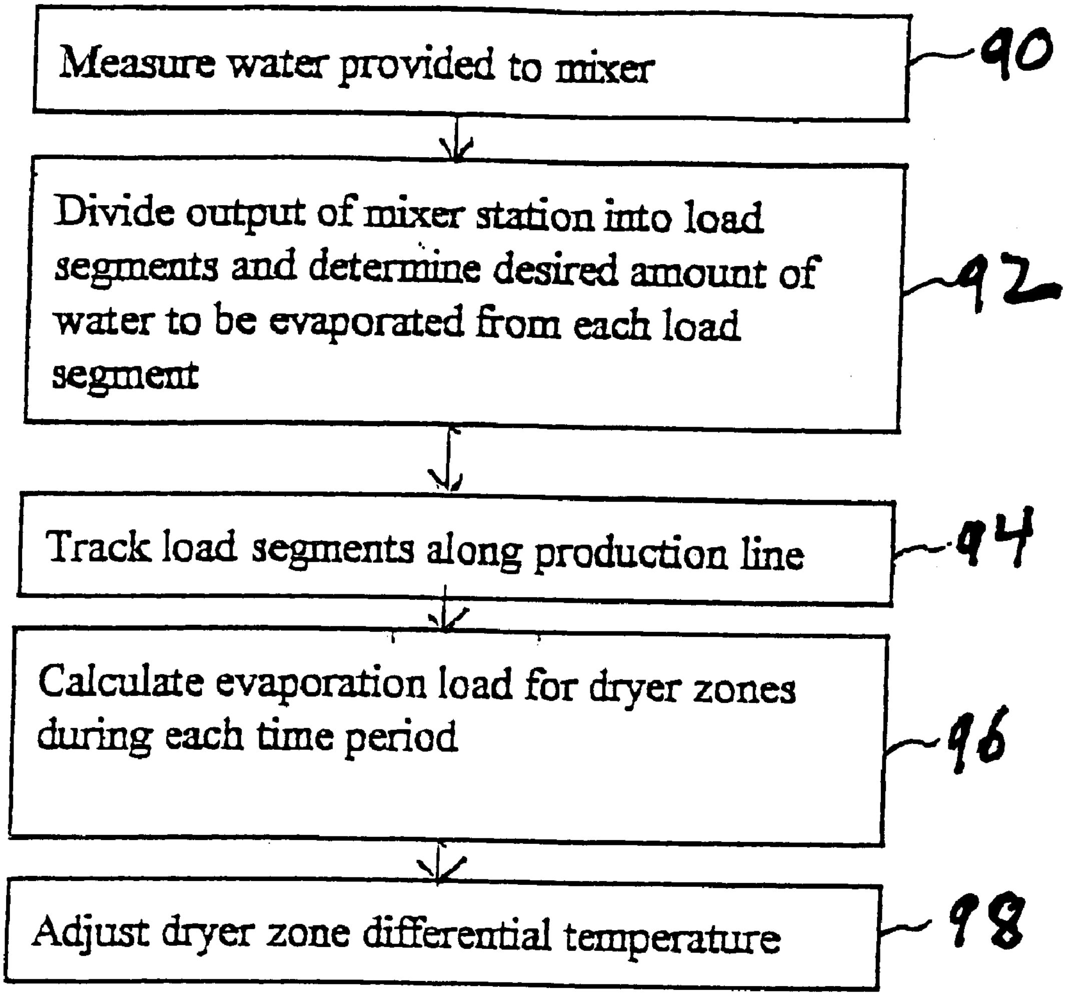
FIG. 6 is a flow diagram of production steps performed by the control system.

After product set up is completed, the production line 10 starts producing boards according to the new control recipe. The steps performed by the control system 40 during a production run are shown in FIG. 6.

As mentioned above, calcined gypsum, water and other additives are combined at the mixer station 16 and then extruded from an extruder between upper and lower paper sheets to provide a continuous strip of gypsum board that progresses along the forming belt 18. The continuous strip of gypsum board is a future load for the dryer unit 26, and is divided into a series of load segments by the control system 40 in the following manner. The quantity of gypsum supplied to the mixer 16 is measured by a weigh belt 86, and the amount of water added to the mixer 16 from various sources is measured by flow meters 88 (step 90), which permits the total amount of water added for a predetermined length of board segment (a "load segment") exiting the extruder to be calculated (the redetermined length of a load segment being equivalent to a production line segment S). The total amount of water added for each load segment is used to determine the desired amount of water to be evaporated from each load segment, which is represented herein as a free water value $e_j$ (where j indicates an arbitrary load segment). The free water value is the excess water contained in each load segment that is not required for the hydration of the calcined gypsum. As each load segment leaves the extruder, its free water value $e_j$ is stored in the register block 76 of shift register 74 that corresponds to the first segment $S_1$ of the production line 10 (step 92). As the load segment progresses along the forming belt 18, and through the production line 10, its free water value $e_j$ is continually shifted in synchronization with the movement of the load segment to the next block 76 that corresponds to the next position of the load segment in production line 10, and in this manner the free water value of a particular load segment is tracked through the entire production line 10 (step 94). The PLC 60 tracks the speed of the line 10 and advances the shift register 74 in appropriate time periods.

The boards are cut into predetermined board lengths at knife 20, after which they pass through the wet end transfer station 22 onto dryer transfer system 24. At the wet end transfer station, boards are inspected and rejected boards are removed before they reach dryer transfer system belt 24. To facilitate board removal, the wet end transfer station 22 includes a reject gate 23 which removes rejected boards from the line 10 upon receiving a signal from an operator activated switch. Thus, the load that progresses along the dryer transfer system 24 to and through the dryer 26 is comprised of successive load segments that can include gypsum board or empty spaces where a board or group of boards has been rejected. When a board or group of boards is rejected from the production line, the free water values $e_j$ of the load segments formerly occupied by such board or group of boards are set to zero by the dryer control system 40. In particular, when a board is rejected, the signal which operates the reject gate 23 also activates a rotary encoder that is connected to the shift register 74, causing the free water values contained in the register blocks 76 corresponding to the production line segments S of line 10 at which the rejected boards are removed to be set to zero as the boards are removed, and the zero values are shifted along the shift register 74 in subsequent time slots, tracking the resulting gap that exists in the line of boards progressing along production line 10.

Based on the free water values of the load segments provided to the dryer 26, and the dryer segment coefficients $k_m$, the total drying duty and drying duty distribution of the dryer zones 78 and 80 can be continuously calculated and the dryer heat energy controlled to suit that duty (steps 96 and 98). In one preferred embodiment, a target differential temperature Delta_T between the inlet and outlet of each of the dryer zones 78 and 80 is calculated in successive time periods based on the amount of free water contained in the total load of boards passing through the dryer 26 during each time period. The time period is determined by the length of time it takes a load segment to pass through a single dryer segment $DS_m$.

Preferably, the target differential temperature Delta_T is calculated for each dryer zone in the following manner. In each time period as load segments move into, through and out of each dryer zone, the free water value of each load segment currently in that dryer zone is multiplied by the coefficient of evaporation $k_m$ for the corresponding dryer $DS_m$ segment in which that load segment is located for that time period. The products resulting from the multiplication of the free water values and coefficients of evaporations for all the load segments located in the dryer zone during the time period are then summed. This summed value is multiplied by the dryer speed (which is tracked by dryer PLC60) and a value representing drying ratio per dryer zone to provide an energy value. The energy value is then converted to a temperature value which is adjusted upward to account for heat losses in the dryer zone. The result is a target differential temperature Delta_T, between the inlet and outlet of the dryer zone, and is used as a set point to control the fuel flow to the burner (or other heat input) of the dryer zone, thereby adjusting the dryer zone differential temperature to match the target differential temperature.

In equation form, the above method for calculating the target differential temperature Delta_T for any given time period for each dryer zone is represented by the following:

$$\text{Delta\_T} = \frac{\left(\sum_{m=1}^{x} e_{(j+m-1)} \cdot k_m\right) \cdot v \cdot KZ}{C_o} + H_L$$

where:

x=total number of dryer segments in the dryer zone;

$k_m$=the coefficient of evaporation for a dryer segment $DS_m$ of the dryer (stored in register 82);

$e_{j+m-1}$=the free water value of the load segment located in a dryer segment $DS_m$ of the dryer zone during the time period in which the calculation is performed (stored in shift register 74);

v=dryer speed (measured value);

KZ=ratio of drying per dryer zone (predetermined value);

$H_L$=heat loss adjustment value (predetermined value); and $C_o$=conversion coefficient to convert numerator of the above equation from an energy value to a temperature value (predetermined value).

The values representing drying ratio per dryer zone (KZ) are predetermined values (based on the number of drying zones that the dryer has), as are the heat loss adjustment values. Similarly, the conversion factors ($C_o$) used to convert the calculated energy value into a temperature value for each of the dryer zones are predetermined values which have been derived empirically for each dryer zone.

If boards have been rejected at the wet end transfer 22, the resulting gaps in the board line passing through the dryer unit 26 will be signified by a free water values $e_j$ of zero being entered in the calculation of the target differential temperature Delta_T, thus causing the evaporative load of the dryer 26 to be reduced, and the dryer zone differential temperatures to be adjusted accordingly.

This helps to prevent the dryer 26 from over-drying boards when gaps occur in the product board line. In addition to wet end transfer rejections, gaps in the board line can also appear at the start and end of a product run, and the system of the present invention can adjust the dryer temperature for such gaps accordingly. The system of the present invention can also adjust for any changes that occur in board formulation for different production runs, thus permitting changes in board formulation to be effected without stopping the production line.

A moisture reading device can be located at the output end of the second zone 80 to provide moisture readings to the dryer operator interface 50, based on which the temperature of zone 80 can be trimmed by an operator through the dryer operator interface 50.

It will be appreciated that the smaller the length of the production line segments $S_1$ (and hence the length of the load segments), the greater the resolution and accuracy of the dryer control system. Preferably, the production line segments $S_1$ have a length less than that of the boards being produced by the line 10.

It will be understood that the control system described above and shown in FIG. 2 is only one of many possible configurations that could be used to implement the system and method of the present invention. Furthermore, although two dryer zones have been shown in FIG. 1, the present invention could be implemented with a dryer having only one dryer zone, or more than two dryer zones, depending upon the requirements of the specific product line.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method for controlling temperature of a dryer in a gypsum board production line in which a load that includes a line of boards is provided to the dryer, comprising the steps of:

determining, for each of a plurality of segments along a length of the load, a desired amount of water to be evaporated from each of the load segments in dependence on a measured volume of water used to make the load segments;

determining the amount of energy required to evaporate the desired amounts of water from the load segments located in the dryer during a particular time period; and adjusting the heat energy provided to the dryer according to said determined amount of energy provided.

2. A method according to claim 1 wherein the step of determining a desired amount of water to be evaporated from each load segment includes:

measuring a volume of water supplied to a mixer station of the production line for each load segment; and calculating and storing the desired amount of water to be evaporated for each load segment based on the measured volume of water.

3. A method according to claim 2 wherein the step of determining a desired amount of water to be evaporated for each load segment includes setting the desired amount of water to be evaporated for a load segment to zero when no board is present in that load segment.

4. A method according to claim 2 wherein the step of determining the amount of energy required to evaporate the desired amounts of water includes:

for each load segment located in a dryer zone of the dryer at the particular time period, calculating the product of the desired amount of water to be evaporated and a co-efficient of evaporation;

summing the products determined for the load segments in the dryer zone; and calculating an energy value by multiplying the summed products by a value representing a speed at which the load segments progress through the dryer zone.

5. A method according to claim 4 wherein the co-efficient of evaporation multiplied with the desired amount of water to be evaporated for a particular load segment is dependent on the location of that load segment within the dryer zone.

6. A method according to claim 5 wherein said step of determining the amount of energy required to evaporate the desired amounts of water includes calculating a target differential temperature between an inlet and outlet of the dryer zone by converting the energy value to a temperature value and adjusting the temperature value to account for heat losses in the dryer zone.

7. A method according the claim 6 wherein the step of adjusting the heat energy provided to the dryer includes adjusting a differential temperature of the dryer zone to match the target differential temperature.

8. A method according to claim 5 wherein all of the load segments have a uniform length.

9. A method according to claim 2 wherein all of the load segments have a uniform length and including the steps of:

(a) providing a shift register having a plurality of shift register blocks;

(b) dividing the production line up into a number of successive production line segments Si each having a length of equal to the uniform length;

(c) associating each of the production line segments Si with a unique block of the shift register; and (d) tracking the desired amount of water to be evaporated from each of the load segments progressing along the production line through successive time periods by storing, for each load segment during each time period, the desired amount of water to be evaporated for the load segment in a shift register block associated with the production line segment that the load segment is passing through during the time period.

10. A method according to claim 9 wherein the step of calculating and storing the desired amount of water to be evaporated includes setting the desired amount of water to be evaporated from a load segment to zero if a board occupying that load segment is removed from the production line.

11. A method according to claim 9 including the steps of providing a further register having a plurality of register blocks;

dividing a dryer zone of the dryer up into X successive dryer segments $DS_m$ each having a length equal to the uniform length;

associating each of the dryer segments $DS_m$ with a unique block of the further register; and providing and storing a value representing a co-efficient of evaporation $k_m$ for each of the dryer segments $DS_m$ in the register block associated with that dryer segment, wherein the step of determining the amount of energy includes determining a speed at which the load segments progress through the dryer and calculating a total energy amount by calculating for each load segment located in the dryer zone at the particular time period a product of the desired amount of water to be evaporated and the co-efficient of evaporation for the dryer segment $DS_m$ through which the load segment is passing at the particular time period, summing the products calculated for the load segments located in the dryer zone at the particular time period, and multiplying the summed products by a value representing a speed at which the load segments progress through the dryer zone and a value representing a desired drying ratio for the dryer zone.

12. A method according to claim 11 wherein the total energy amount is converted to a target differential temperature between an inlet and an outlet of the dryer zone and adjusted to compensate for heat losses from the dryer zone, and the step of adjusting the heat energy provided to the dryer includes adjusting the differential temperature of the dryer zone to match the target differential temperature.

13. A gypsum board drying device for a gypsum board production line, comprising:

a dryer including a heat energy source for providing heat energy to the dryer;

a transfer system for transferring a load comprising a line of gypsum boards to and through the dryer; and a control system for the dryer including:

(a) determining means for dividing the load to be transferred to the dryer into segments along a length of the load and determining a desired amount of water to be evaporated from each of the load segments;

(b) calculating means responsive to the determining means for determining an amount of energy required to evaporate the desired amounts of water from all of the load segments located in the dryer during a particular time period; and (c) adjustment means responsive to the calculation means and operatively connected to the heat energy source for adjusting the heat energy provided to the dryer according to the determined amount of energy.

14. A drying device according to claim 13 wherein the determining means includes measuring means for measuring the amount of water provided to a mixer station of the production line to produce each load segment and means for calculating and storing the desired amount of water to be evaporated for each load segment based on the measured amount.

15. A drying device according to claim 14 wherein the calculating and storing means is configured to track in consecutive time periods the location and desired amount of water to be evaporated for each load segment, and includes:

a shift register having a plurality of shift register blocks;

means for dividing the production line into a number of successive production line segments each having a length approximately equal to a length of one load segment;

means for associating each of the production line segments with a unique shift register block; and means for storing the desired amount of water to be evaporated from each load segment in the shift register block associated with the production line segment that each load segment is passing through during each time period.

16. A drying device according to claim 13 wherein the dryer includes a plurality of drying zones each having an independent heat energy source controlled by said adjustment means and the control system includes means for determining a dryer speed at which the load segments progress through the dryer and communicating the dryer speed to the calculation means, the calculation means being configured to, for each drying zone:

calculate, for each load segment located in the dryer zone during the time period, the product of the desired amount of water for the load segment and a co-efficient of evaporation that is dependent on the location of the load segment in the dryer zone;

sum the products obtained for the load segments in the dryer zone; and calculate an energy value by multiplying the summed products for the dryer zone by the dryer speed and a predetermined value representing a desired drying ratio for the dryer zone.

17. A drying device according claim 13 wherein the determining means is configured to set the desired amount of water to be evaporated for a particular load segment to zero when no board is located in the load segment.

18. A drying device according to claim 13 wherein the determining means and the adjustment means each include a programable logic control device, and the calculation means includes at least one pre-programmed computer system.

19. A dryer control system for controlling the operation of a dryer in a gypsum board production line in which a load that includes a line of gypsum boards is provided to the dryer, the system comprising:

determining means for measuring the amount of water provided to a mixer station of the production line, dividing the load into a series of consecutive load segments of uniform length, and determining and storing a desired amount of water to be evaporated from each of the consecutive load segments based on the measured amount of water;

calculating means responsive to the determining means for determining an evaporation load of the dryer based on the desired amounts of water to be evaporated from all of the load segments located in the dryer at a particular time; and adjustment means responsive to the calculating means for controlling a heating element of the dryer to adjust heat energy provided to the dryer according to the determined evaporation load.

* * * * *